United States Patent Office 3,684,492
Patented Aug. 15, 1972

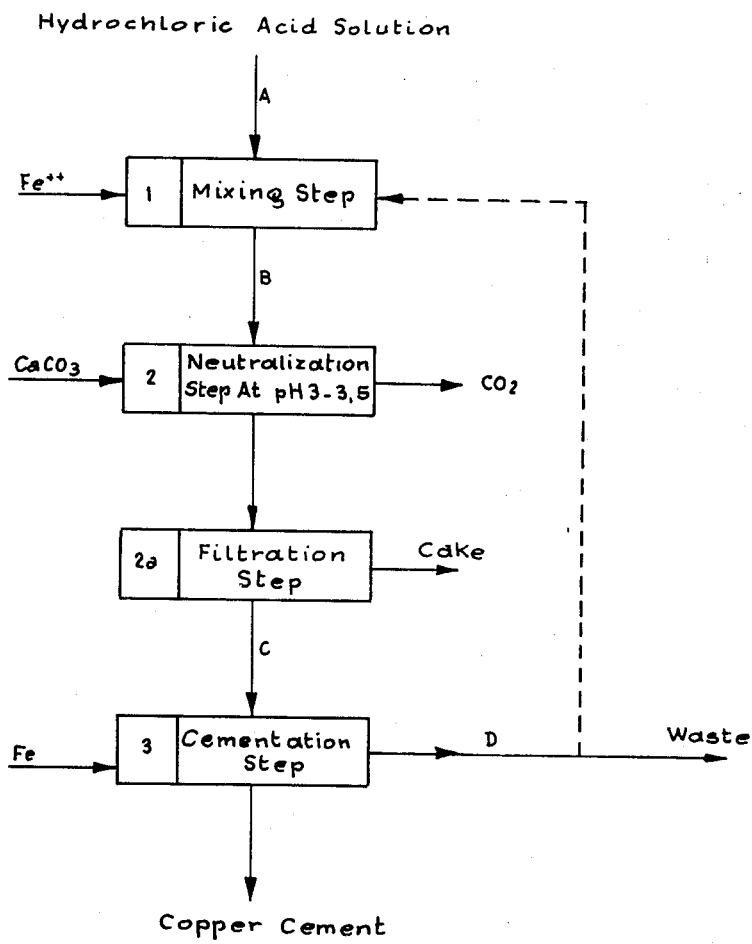

3,684,492
PROCESS FOR THE PREPARATION OF ARSENIC-FREE COPPER CEMENT FROM ARSENICAL ACID SOLUTIONS
Ariano Colombini and Bruno Viviani, both of 8 Via Paletto, Novara, Italy; Antonio Massimino, 27 Piazza G. Perotti, Carru, Italy; and Giuseppe Sironi, 3 Via Piave, Novara, Italy
Filed June 30, 1970, Ser. No. 59,867
Claims priority, application Italy, July 1, 1969, 19,010/69
Int. Cl. C22b 3/00
U.S. Cl. 75—109
4 Claims

ABSTRACT OF THE DISCLOSURE

A process for obtaining copper cement, free of arsenic, from acid arsenical solutions obtained by chlorinating roasting or by chlorinating volatilization of iron minerals, in particular of pyrite ashes. The process consists of the following three stages: In stage 1, the starting solution A is admixed with a ferrous salt so that the molar concentration of the $Fe^{++}$ ion becomes equal to or slightly greater than that of iron $Cu^{++}$, obtaining thus a solution B. In stage 2, the solution B is brought up to a pH of between 3 and 3.5, at a temperature comprised between 20° and 80° C., with a neutralizer, and is then filtered thereby obtaining filtrate C. In stage 3, the filtrate is cemented with an excess of metal iron, at a temperature of from 20° to 40° C., thereby obtaining copper cement free of arsenic, and a discharge solution D which is also free of arsenic.

---

Our invention relates to a process for obtaining arsenic-free copper, starting from acid solutions containing, besides copper ions, chlorine ions and arsenic.

In the purification processes of iron minerals (pyrite cinders, pyrrhotite cinders, flotation concentrates, etc.) by chlorinating roasting or by chlorination volatilization there are obtained solutions which contain, among others, iron, copper, zinc, lead, silver, gold and arsenic. These solutions undergo a series of treatments to separate the valuable components as metals or oxides.

According to the classical hydrometallurgical process of the "Duisburger Kupferhutte," the first treatment is a cementation of the copper, together with the gold and the silver with a metal that is more electropositive than copper, such as iron or zinc. The term "cementation" as used herein means the process described in its main outlines, for instance, in Ullman's Encyclopedia, vol. 11 (1960), pp. 174, 185–187.

There are drawbacks with this process. The main drawback is that when starting from arsenical solutions, one obtained copper cement which is heavily impure by arsenic, or which in at least has an arsenic content greater than the tolerance limit of 0.3%. Moreover, in the course of the cementation, highly toxic arsine develops as well as a high iron consumption according to the reactions:

$$Cu^{++}+Fe \rightarrow Cu+Fe^{++}$$

$$2Fe^{+++}+Fe \rightarrow 3Fe^{++}$$

$$2H^{+}+Fe \rightarrow H_2+Fe^{++}$$

The above reactions all lead, furthermore, to the formation of a considerable quantity of $Fe^{++}$ which must then be removed from the solution in order to be able to recover the other metals, or in order to be able to discharge the solution without danger to the disposal.

A process (described in German Pat. No. 1,127,597) which partly overcomes this drawback, thus permitting the amount of iron for the cementation to be limited, consists in precipitating the copper from solution in the form of cuprous chloride by adding finely subdivided metallic copper, according to the reaction:

$$CuCl_2+Cu \rightarrow 2CuCl$$

The CuCl thus formed, precipitates for the greatest part, and is then separated and processed to metallic copper by different processes. The residual copper in solution is then reduced to copper cement, which is recycled to the above-mentioned precipitation stage of the process, in order to reduce the bivalent copper.

Another process applied industrially (described by German Pat. No. 1,153,907) consists of a reduction treatment of the bivalent copper by $SO_2$ and metallic copper. The separated CuCl is dechlorinated separately by the addition of lime, thereby yielding cuprous oxide, which is directly processable to raw copper in a reduction oven, while the residual copper left in solution is equally cemented.

These cuprous chloride processes offer substantial advantages only when the cuprous chloride may be directly used for the production of copper oxychloride, which, in turn, may be used as a fungicide and an insecticide. In the opposite case, the cuprous chloride is an intermediate which still requires a consumption of metallic iron in order to obtain copper cement or the use of lime in order to obtain cuprous oxide. The main drawback, anyway, still is the fact that the copper cement or the CuCl are contaminated by the arsenic present in the solution.

Another process (described in German Pat. No. 1,222,683) overcomes this drawback by carrying out both the reduction phase of the $Cu^{++}$ to $Cu^{+}$ (with the separation of CuCl) and the cementation phase of the residual $Cu^{+}$ in solution to metallic Cu, in two stages or steps. This allows to obtain two types of cement, one rich in arsenic and one free of it, which are recycled respectively to the first and to the second reduction stage. From this latter one, it is thus possible to obtain CuCl free of arsenic, which is separated and processed to metallic copper.

This process appears to be very complicated because it is composed of four process stages in series, which have to be balanced among others. It also has the drawback of giving a product which must be further processed. Moreover, the solutions freed of the copper contain, besides the $Fe^{+++}$, all the arsenic initially present in the solution, a fact which makes even more mandatory to purify the solution, whether or not one wishes to recover the other metals present therein.

These processes are strictly bound to the necessity to insolubilize the copper as cuprous chloride, that is, to a cuprous chloride with a low Cl/Cu molar ratio, in solution favorable to the precipitation of CuCl. The solutions originating from the chlorinating volatilization, in general have chloride contents that are rather high, wherefore the obtention of CuCl becomes rather difficult.

We have now found a three-stage process for obtaining from arsenical copper solutions a copper cement which has a high Cu content and free of arsenic.

The starting solutions are obtained from iron minerals by chlorinating roasting or by chlorinating volatilization. They contain copper ions, chlorine, arsenic, non-ferrous metal ions (such as Zn, Pb, Ag, Au, Mn, Co) and possibly iron ions and sulfate.

According to this process, to the solution is added a ferrous salt (stage 1) so that the molar concentration of the $Fe^{++}$ ion becomes equal to that of the $Cu^{++}$ ion. The solution is then brought up to a pH of 3–3.5 with a neutralizer (stage 2). Thereby, one obtains a precipitate practically free of copper and a solution which, after filtration, is practically free of arsenic and contains all the copper in the monovalent form. This solution is cemented quantitatively thus yielding a copper cement of a high Cu content and free of As (stage 3).

The drawing represents an embodiment of this process.

In stage 1, to the starting solution A is added part of solution D, flowing out of the cementation stage 3 and containing $Fe^{++}$ and other ions, in such a proportion that the molar concentration of the $Fe^{++}$ ion, in the resulting solution B, becomes equal or slightly greater than that of the $Cu^{++}$ ion. It is not advisable to exceed the value of 1.1 in the $[Fe^{++}]$; $[Cu^{++}]$ ratio. In order to avoid dilution of the copper to solution A, a ferrous salt in concentrated solution or even in the solid state, such as waste $FeSO_4 \cdot 7H_2O$, may be added.

In stage 2, the solution B is treated continuously with $CaCO_3$ in powder form or in a slurry with a high content in solid (more than 500 g./l.) in one or more reactors, preferably 2, at a temperature between 20° and 80° C., but preferably above 50° C., and with total contact times of from 60 to 90 minutes, so that in the last reactor the pH will be maintained between 3 and 3.5. This neutralization of the solution at pH 3–3.5 may be carried out at least partially with any basic substance available, more particularly with products obtained in the course of the hydrometallurgical treatment itself, such as $Fe(OH)_3$ which is obtained by the elimination of the iron from the solution after cementation (in the case, it is required to cover other elements such as Co or Zn).

Stages 1 and 2 may be carried out simultaneously using a salt or a mineral, e.g. siderite, capable of simultaneously neutralizing the solution to the required pH and to provide the necessary $Fe^{++}$ in solution.

In stage 2, the following reactions occur:

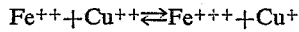

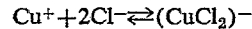

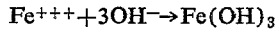

The total reduction of $Cu^{++}$ to the monovalent form is made possible by the equivalence occurring between $Fe^{++}$ and $Cu^{++}$ and by the precipitation of the $Fe^{++}$ as the hydroxide. The monovalent copper is complexed by the $Cl^-$ ions and remains in solution as a complex ion $(CuCl_2)^-$. The zinc ion is present in solution as the complex ion $(ZnCl_4)^-$. The concentration of the chlorine ions must be sufficient for complexing both $Cu^+$ and $Zn^{++}$, that is, it must be equal to at least 1.116 g./l. of $Cl^-$ per 1 g./l. of $Cu^+$ and 2.17 g./l. of $Cl^-$ per 1 g./l. of $Zn^{++}$. It is preferable to operate with an excess of from 5 to 20% with respect to the stoichiometric quantity. If the concentration in $Cl^-$ of solution B turns out to be below the fixed limit, it becomes necessary to add an alkaline or alkaline earth chloride, for instance, $NaCl$, $CaCl_2$, solution D after removal of Fe or solution D after removal of Fe and of Zn.

In stage 1, both the concentration of $Fe^{++}$ as well as that of $Cl^-$ may contemporaneously be corrected by the addition of $FeCl_2$ (pickling solution with HCl or solution obtained from waste $FeSO_4 + CaCl_2$).

The reaction is almost quantitative when operating under suitable conditions of temperature and contact times. If the solution B contains $SO_4^{--}$ ions, calcium sulfate $(CaSO_4 \cdot 2H_2O)$ precipitates besides the Fe hydroxide. Moreover, in this stage, the precipitation of the arsenic in the form of Fe arsenite occurs. The Fe arsenite is included in the cake. The greater the starting Fe/As ratio of the solution, the more effective is the precipitation of the As, which is thus favored by the addition of $Fe^{++}$ carried out for the above-mentioned reasons.

After filtering (this operation being marked 2a in the attached diagram), the solution thus obtained, C, is continuously cemented (stage 3) by operating with an excess of iron (turnings, scrap, sponge, powder) and by regulating the flow in such a way as to attain the total cementation of the copper. This operation is carried out at a temperature between 20° and 40° C., but preferably at room temperature, with contact times of from 10 to 20 minutes and preferably in the absence of air, for instance in an atmosphere of $CO_2$ or $N_2$. The $CO_2$ may come from the neutralization phase. The reaction occurs as follows:

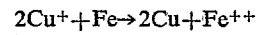

while a very small part share of Fe may react with $Fe^{+++}$ and $H^+$ according to the above-described reactions. The consumption in iron turns out to be little greater than the stoichiometric (½ Fe per 1 Cu).

After separation from the cement, solution D is found to be practically free from Cu and As and contains a quantity of $Fe^{++}$ in moles little greater than the moles of copper in solution C. As already stated, a portion of solution D may be recycled, to stage 1, so that the ratio of molar concentrations between $Fe^{++}$ and $Cu^{++}$ in the resulting solution B is equal to or slightly greater than at stage 1.

An alternative to the production of copper cement is the production of basic copper chloride $3Cu(OH)_2 \cdot CuCl_2$. In this case, air is blown into solution C at a temperature of from 20° to 40° C., but preferably at room temperature, at a pH value comprised between 5.4 and 5.8. The quantity of air used in this operation is equal to 20–30% excess with respect to the stoichiometric for the oxidation. Under the effect of the oxidation alone, the pH of solution C rises from the value of 3–3.5 to the value of about 5 and then, by the addition of sodium hydroxide, to the value of 5.4–5.8. Under such conditions, the precipitation of the copper as basic chloride is almost complete.

The fundamental advantage of the process lies in the possibility of obtaining a copper cement of a high Cu content (greater than 90%) which is free of arsenic (As less than 0.02%), by direct cementation in one single stage and with a consumption in iron equal to half the consumption normally occurring in industry. Another advantage is that solutions freed of the copper do not contain As and have a contents in $Fe^{++}$ less than that of similar solutions from industrial plants. The problem of the removal of these elements, harmful both for the possible recovery of other valuable elements as well as for the disposal, is therefore very much reduced.

Moreover, there are further advantages:

The reduction of the copper from bivalent to monovalent copper is carried out without using $SO_2$ or metal Cu, by means of a cheap ferrous salt in an almost stoichiometric amount;

The cementation of copper is carried out under better operating conditions owing to the absence of As and thus in the absence of arsine;

The cementation in an inert atmosphere avoids the formation of hydroxides and basic iron salts, for instance $Fe(OH)Cl_2$, which lower the Cu content of the cement;

The cementation occurs with iron losses lower than those of the known processes, due to the absence of $Fe^{+++}$ and to the minor concentration of $H^+$, that is to the higher pH;

The precipitation of the basic copper chloride by air does not cause any formation of $Fe^{++}$ ions which would then have to be eliminated; and The recycling of solution D, containing $CaCl_2$, besides $Fe^{++}$, brings into solution A also $Cl^-$ ions which are useful for forming $(CuCl_2)^-$ and $(ZnCl_4)^{--}$ complexes and $Ca^{--}$ ions for precipitating the $SO_4^{--}$ ion as calcium sulfate.

The following examples are given for illustrating, however, without limiting, the process of this invention.

EXAMPLE 1

By a chlorinating volatilization of pyrite ashes, from the scrubbing column for the volatile chlorides there was obtained an aqueous solution A with the following composition (in g./l.):

| | |
|---|---|
| Zn=50.2 | Mn=0.16 |
| Cu=21.8 | Co=0.14 |
| Fe=12.8 | Ag=0.01 |
| As=4.5 | $SO_4^{--}$=31.5 |
| Pb=0.85 | $Cl^-$=142.5 |
| Ca=0.89 | |

Heptahydrate ferrous sulfate (24 kg./hr.) was continuously added to solution A (at a flow rate of 1 m.³/hr.) wherefore the concentrations of the iron and of the $SO_4^{--}$ ion increased respectively to 17.7 g./l. and to 39.8 g./l. The resulting solution B showed a ratio between the molar concentrations $[Fe^{++}]:[Cu^{++}]$ equal to 1.026. Solution B was continuously fed to the first of the two reactors arranged in cascade. An aqueous suspension of limestone was fed also at a feed rate of 800 g./hr. into the first reactor, through a metering valve. A pH-meter controlled the pH of the slurry of the second reactor keeping it at 3.4 by regulating the addition of limestone into the first reactor. The neutralization (stage 2) was conducted at between 55° and 60° C. in a $CO_2$ atmosphere, under constant stirring, for a total contact time of the slurry in the reactors of 1 hour.

After filtering in a $CO_2$ atmosphere, a solution C was obtained (1 m.³/hr.), which had the following composition (in g./l.):

| | |
|---|---|
| Zn=45.0 | Mn=0.15 |
| Cu=20.7 | Co=0.12 |
| Fe=0.28 | Ag=0.007 |
| As=0.03 | $SO_4^{--}$=1.20 |
| Pb=0.38 | $Cl^-$=135.0 |
| Ca=18.8 | |

The cake (120 kg. of dry weight) was then washed with water (60 liters) at pH 3.5 maintained by the addition of HCl. The wash water contained 3.54% of the starting copper and 8.5% of the starting zinc, and was recycled to the chloride scrubbing column. In this stage the starting copper was distributed as follows:

| | Percent |
|---|---|
| Solution C | 95.02 |
| Wash water | 3.54 |
| Washed cake | 1.43 |

Solution C (1 m.³/hr.), coming from the neutralization stage, was conveyed into a continuous cementer having a free volume of 0.25 m.³, and containing iron scrap in heavy excess over the copper to be cemented. The cementation was conducted at room temperature and in a $CO_2$ atmosphere, with a 15 minute residence time of the solution in the cementer.

Thereby were obtained: 21.6 kg./hr. of cement, containing 94.5% of copper and 0.014% of As. The cementation gave a yield of 98.5% and a consumption in iron of 0.463 kg. per 1 kg. of produced copper.

Solution D (1 m.³/hr.) showed the following composition (in g./l.):

| | |
|---|---|
| Zn=44.80 | Ag=0.00002 |
| Cu=0.30 | Mn=0.15 |
| Fe=9.72 | Co=0.12 |
| As=0.00015 | $SO_4^{--}$=1.18 |
| Pb=0.055 | $Cl^-$=134.5 |
| Ca=18.8 | |

In a test carried out in the same way, solution C (1 m.³/hr.) was continuously fed into a reactor. Air was blown in through the reactor bottom with 25% excess in order to precipitate the basic copper chloride. The oxidation was carried out at room temperature at a pH 5.6 (maintained by means of addition of 3–3.5 kg./hr. of $Na_2CO_3$), with a residence time of the solution in the reactor of 60 minutes. Thus there were obtained 67.60 kg./hr. of basic copper chloride with a Cu content of 97%, and with a yield in the elimination of the copper of the solution of 95%. The outflowing solution may be subjected to normal treatments for the recovery of other metals (Co, Ni, Zn).

EXAMPLE 2

From a plant for the chlorinating volatilization of pyrite ashes, there was obtained a solution A having the following composition (in g./l.):

| | |
|---|---|
| Zn=46.2 | Mn=0.18 |
| Cu=24.82 | Co=0.15 |
| Fe=16.59 | Ag=0.03 |
| As=4.86 | $SO_4^{--}$=33.56 |
| Pb=0.76 | $Cl^-$=149.2 |
| Ca=0.29 | |

To solution A (flow rate 1 m.³/hr.) there was continuously admixed 0.310 m.³/hr. of a solution coming from the successive cementation. The resulting solution B showed a ratio between the molar concentrations $[Fe^{++}]:[Cu^{++}]$ equal to 1.005 and the following composition (in g./l.):

| | |
|---|---|
| Zn=44.8 | Mn=0.17 |
| Cu=19.0 | Co=0.14 |
| Fe=14.3 | Ag=0.024 |
| As=3.7 | $SO_4^{--}$=25.90 |
| Pb=0.59 | $Cl^-$=146.6 |
| Ca=5.50 | |

Solution B flowed continuously into the first of two reactors arranged in cascade, and into which was fed through a metering valve also an aqueous limestone suspension at 800 g./l. A couple of electrodes regulates the admixture of limestone in the first reactor so as to have in the slurry of the second reactor a pH value of 3.3. The neutralization was conducted at between 55° and 60° C. under stirring, with a total residence time of the slurry in the reactors of 1 hour.

By the filtering of the slurry, carried out in a $CO_2$ atmosphere, there was obtained a solution C (1.3 m.³/hr.) which had the following composition:

| | |
|---|---|
| Zn=40.3 | Mn=0.16 |
| Cu=17.90 | Co=0.13 |
| Fe=0.25 | Ag=0.016 |
| As=0.015 | $SO_4^{--}$=1.16 |
| Pb=0.24 | $Cl^-$=138.5 |
| Ca=22.50 | |

The cake was washed following the same procedures as those described in Example 1. The wash waters, containing 4.8% of the starting copper and 8.0% of the starting zinc, were recycled into the scrubbing column for chlorides. The distribution of the copper (in percent with respect to the starting copper) was:

| | Percent |
|---|---|
| Solution C | 94.10 |
| Wash water | 4.80 |
| Washed cake | 1.10 |

Solution C (1.3 m.³/hr.), coming from the neutralization step, was introduced into a continuous cementer with a free volume of 0.325 m.³ in which the iron scrap is constantly maintained in heavy excess on the quantity of copper to be cemented. The cementation takes place at room temperature with a residence time of the solution in the cementer of 15 minutes.

Thereby were obtained 18.75 kg. of cement with a copper content of 94.2% and with an arsenic content of 0.016%. The cementation yield was 98.5% with a consumption in iron of 0.492 kg. per kg. of cemented copper.

The outflowing solution D showed the following composition:

| | |
|---|---|
| Zn=40.0 | Ag=0.0004 |
| Cu=0.25 | Mn=0.163 |
| Fe=6.93 | Co=0.129 |
| As=0.0003 | $SO_4^{--}$=1.15 |
| Pb=0.026 | $Cl^-$=138.0 |
| Ca=22.3 | |

0.31 m.³ of this solution were recycled to the stage 1, in order to correct the ratio [Fe++]:[Cu++], while the remainder flows to the subsequent hydrometallurgical operations for the recovery of other elements.

EXAMPLE 3

From the scrubbing column of a chlorinating volatilization plant for pyrite ashes, there was obtained a solution A having the following composition (in g./l.):

| | |
|---|---|
| Zn=81.5 | Mn=0.15 |
| Cn=30.0 | Co=0.12 |
| Fe=4.4 | Ag=0.01 |
| As=3.3 | $SO_4^{--}$=27.2 |
| Pb=0.82 | $Cl^-$=154.0 |
| Ca=0.51 | |

To solution A (flow rate 1 m.³/hr.) there was admixed in continuous 0.6 m.³/hr. of a solution of $CaCl_2$ (at 130 g./l. of Cl), obtained from a solution D after the removal of the metals, and 75.2 kg./hr. of heptahydrate ferrous sulfate. A suspension B was obtained therefor, whose liquid part showed a ratio between the molar concentrations [Fe++]:[Cu++] equal to 1.085, while it had the following composition (in g./l.):

| | |
|---|---|
| Zn=50.95 | Mn=0.094 |
| Cu=18.75 | Co=0.075 |
| Fe=17.85 | Ag=0.006 |
| As=2.06 | $Cl^-$=145.0 |
| Pb=0.512 | |

Into the first of the two reactors there was continuously fed a suspension B and, through a metering valve, an aqueous limestone suspension at 800 g./l. A pair of electrodes regulates the addition of limestone to the first reactor, so as to have in the slurries of the second reactor a pH value of 3.2. The neturalization is conducted at between 55° and 60° C. under constant stirring and with a total residence time of the slurry in the reactors of 1 hour. After filtering the slurry, in a $CO_2$ atmosphere, there was obtained a solution C (1.6 m.³/hr.) which showed the following composition (in g./l.):

| | |
|---|---|
| Zn=47.40 | Mn=0.084 |
| Cu=17.78 | Co=0.069 |
| Fe=0.36 | Ag=0.005 |
| As=0.005 | $SO_4^{--}$=0.40 |
| Pb=0.26 | $Cl^-$=138.0 |
| Ca=62.0 | |

The cake was washed according to the same procedures followed in Example 1, the wash waters containing 4% of the starting copper and 6.5% of the starting zinc, were recycled to the scrubbing columns for the separation of the chlorides. The distribution of the copper (in percent with respect to the starting copper) was as follows:

| | |
|---|---|
| Solution C | 94.8 |
| Wash water | 4.0 |
| Washed cake | 1.2 |

Solution C (1.6 m.³/hr.), coming from the neutralization step, was introduced into a continuous cementer having a free volume of 0.400 m.³, in which the iron scrap was constantly maintained in heavy excess with regard to the amount of copper to be cemented. The cementation occurs at room temperature with a residence time of the solution in the cementer of 15 minutes.

Thus there was obtained 18.54 kg. of cement with a 94.6% copper content and an 0.012% arsenic content. The cementation yield was 98.6% with an iron consumption of 0.482 kg. per kg. of cemented copper.

The effluent solution D had the following composition (g./l.):

| | |
|---|---|
| Zn=47.20 | Mn=0.083 |
| Cu=0.23 | Co=0.068 |
| Fe=5.63 | Ag=0.001 |
| As=0.004 | $SO_4^{--}$=0.40 |
| Pb=0.025 | $Cl^-$=138.0 |
| Ca=62.0 | |

This solution was then sent to successive operations of deferritization and dezincification by conventional techniques.

We claim:
1. A process for obtaining copper cement, free of arsenic, from an arsenical acid solution of copper obtained by chlorinating roasting or by chlorinating volatilization of iron minerals, containing copper, iron, arsenic, chlorine and non ferrous metals, which comprises:
   (a) in a first stage, admixing said solution with a ferrous salt so that the molar concentration of the Fe++ ion becomes equal to a value of from 1 to 1.1 of Cu++ ion;
   (b) in a second stage bringing the resulting solution to a pH of between 3 and 3.5, at a temperature comprised between 20° and 80° C., and then filtering to obtain a filtrate;
   (c) in a third stage cementing the filtrate with an excess of metallic iron, at a temperature of from 20° to 40° C., thereby obtaining copper cement free of arsenic, and an affluent solution which is also free of arsenic.

2. The process of claim 1, wherein $FeSO_4 \cdot 7H_2O$ is added to the solution in the first stage.

3. The process of claim 1, wherein part of the effluent solution from the third stage is added in the first stage to the solution.

4. The process of claim 1, wherein limestone is added in the second stage to adjust the pH.

References Cited
UNITED STATES PATENTS

| | | | |
|---|---|---|---|
| 1,523,444 | 1/1925 | Neuill et al. | 75—109 |
| 2,829,964 | 4/1958 | Zimmerley et al. | 75—117 X |
| 3,424,575 | 1/1969 | Long | 75—109 |
| 2,130,278 | 9/1938 | Keyes | 75—109 X |
| 3,476,554 | 11/1969 | Spedden et al. | 75—117 X |
| 3,574,599 | 4/1971 | Ortloff et al. | 75—109 |

FOREIGN PATENTS

| | | | |
|---|---|---|---|
| 1,222,683 | 8/1966 | Germany | 75—109 |

HERBERT T. CARTER, Primary Examiner

U.S. Cl. X.R.

23—50 R; 75—117